(12) United States Patent
Van Bussel

(10) Patent No.: US 6,789,830 B2
(45) Date of Patent: Sep. 14, 2004

(54) VEHICLE

(75) Inventor: Johannes Gerardus Van Bussel, Venray (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/302,776

(22) Filed: Nov. 22, 2002

(65) Prior Publication Data

US 2003/0122395 A1 Jul. 3, 2003

(30) Foreign Application Priority Data

Nov. 22, 2001 (EP) .............................................. 01204514

(51) Int. Cl.[7] .............................. B62D 33/08; B62C 1/06
(52) U.S. Cl. .................................. 296/26.09; 296/146.8
(58) Field of Search .......................... 296/25.08, 28.09, 296/26.1, 26.11, 50, 51, 52, 53, 55, 147, 149, 146.8, 99.1, 193.08, 193.03; 410/117, 118, 127, 129, 130

(56) References Cited

U.S. PATENT DOCUMENTS

| | | | | |
|---|---|---|---|---|
| 1,924,030 A | * | 8/1933 | Elser | |
| 3,025,804 A | * | 3/1962 | Bruning | |
| 3,378,298 A | * | 4/1968 | Wingen | |
| 3,419,304 A | * | 12/1968 | Sangimino | |
| 3,927,911 A | * | 12/1975 | Rosquist | 297/15 |
| 4,252,363 A | * | 2/1981 | Rodrigue | |
| 4,621,856 A | * | 11/1986 | McKenzie | |
| 4,712,827 A | * | 12/1987 | Jensen | |
| 4,781,498 A | * | 11/1988 | Cox | 410/118 |
| 5,029,928 A | * | 7/1991 | Huber | 296/63 |
| 5,368,354 A | * | 11/1994 | Martin | 296/64 |
| 6,129,411 A | * | 10/2000 | Neff et al. | 296/196 |
| 6,505,878 B1 | * | 1/2003 | Mascolo | 296/146.16 |
| 6,517,135 B2 | * | 2/2003 | De Gaillard | 296/26.09 |
| 6,547,298 B2 | * | 4/2003 | Sotiroff et al. | 296/26.09 |
| 6,588,824 B2 | * | 7/2003 | Neubrand | 296/99.1 |
| 2002/0060479 A1 | * | 5/2002 | Tolinski et al. | 296/51 |
| 2002/0079718 A1 | * | 6/2002 | Neubrand | 296/99.1 |

FOREIGN PATENT DOCUMENTS

| | | | | |
|---|---|---|---|---|
| DE | 3414617 | * | 10/1985 | 296/26.08 |
| DE | 3837252 | * | 5/1990 | 296/26.08 |
| DE | 38 43 675 | | 6/1990 | |
| EP | 0 943 472 | | 9/1999 | |
| FR | 2 748 241 | | 11/1997 | |
| GB | 2209999 | * | 6/1989 | 296/26.09 |
| JP | 63-159131 | * | 7/1988 | 296/146.8 |
| WO | 008908035 | * | 9/1989 | 296/26.09 |

* cited by examiner

Primary Examiner—D. Glenn Dayoan
Assistant Examiner—H. Gutman
(74) Attorney, Agent, or Firm—Westman, Champlin & Kelly, P.A.; S. Koehler

(57) ABSTRACT

A vehicle includes a passenger compartment enclosed by a body, which body includes at least a roof present at the upper side, two side walls positioned opposite each other on either side of a longitudinal axis of the vehicle, which join the roof, and a rear wall, which joins both the roof and the side walls. At least a portion of the rear wall and a rear portion of the roof can be moved in a forward direction so as to form a reduced passenger compartment and a freely accessible loading space located therebehind.

15 Claims, 4 Drawing Sheets

VEHICLE

BACKGROUND OF THE INVENTION

The invention relates to a vehicle comprising a passenger compartment enclosed by a body, which body includes at least a roof present at the upper side, two side walls positioned opposite each other on either side of the longitudinal axis of the vehicle, which join the roof, and a rear wall, which joins both the roof and the side walls.

Generally, the rear part of the passenger compartment is available for transporting goods, such as luggage or the like. One drawback, however, is the fact that voluminous goods, such as furniture, plants or the like, hardly fit into the available space, if at all.

Consequently, it is an object of the present invention to provide a solution for this problem.

SUMMARY OF THE INVENTION

In order to accomplish that objective, the vehicle according to an aspect of the invention includes at least a portion of the rear wall and a rear portion of that roof can be moved in a forward direction so as to form a reduced passenger compartment and a freely accessible loading space located therebehind.

When said rear wall portion and said roof portion have been moved to their forward position, a freely accessible space is formed therebehind, since said loading space is substantially open on the upper side and on the rear side, so that large goods can be received therein.

In one embodiment, adjoining body portions join each other sealingly in the forward position of said rear wall portion and said roof portion. In this manner it is ensured that the comfort of the occupants of the vehicle is not affected. The passenger compartment is fully closed, both in the situation of a passenger compartment having maximum dimensions and in the situation of the passenger compartment having reduced dimensions.

Various solutions are available for effecting such a fully closed passenger compartment in the situation with the reduced dimensions. For example, the rear wall portion sealingly engages one or a number of the following vehicle parts in the forward position: the side walls, the fixed front roof portion, the movable rear roof portion, a vehicle floor, front seats and/or rear seats that are present in the passenger compartment. Within this framework, the sealing engagement between the vehicle parts can be simplified or aided by using additional sealing elements, for example in the form of rubber sealing lips, sealing strips or sealing sections, at the places where said parts engage each other.

In one embodiment of the vehicle according to the invention, the rear wall portion is furthermore pivotable about a transverse axis. The angle at which the rear wall portion is inclined in its original position (on the rear side of the vehicle) can thus be different from the angle of inclination in the forward position. It is conceivable, for example in one embodiment, for the rear wall portion to be inclined at an angle with respect to the vertical in its original position, while it is substantially vertical in its forward position. Such a position change of the rear wall portion is possible because said rear wall portion is pivotable about a transverse axis of the vehicle.

Although it is conceivable per se that the rear wall portion and the rear roof portion are each individually movable in a forward direction, it may be advantageous for the rear wall portion to be jointly moved with the rear roof portion. This can be realized, for example, by using a mechanical connection, for example, links, cables, etc., between the two vehicle portions. Movement of one of said portion, for example the rear roof portion, in a forward direction automatically leads to a corresponding forward movement of the other portion, in this case the rear wall portion.

In the case of such joint movability of the rear roof portion and the rear wall portion, it is possible to interconnect the two portions by means of a hinge. Preferably, said hinge forms a sealing joint between the aforesaid portions in all its positions.

In order to effect a controlled movement of the rear wall portion from its original position to its forward position, the rear wall portion can be provided with suitable guide members such as cams, rollers and the like, which co-act with stationary guideways (e.g. channels or ribs). The selection of the number and type of guide members and guideways depends on the geometry of the vehicle and the desired movement of the rear wall portion.

Thus, the guideways may comprise at least upper guides present at the upper side of the side walls, which extend substantially parallel to the roof, in which case the rear wall portion is provided with corresponding cooperating guide members at its upper side. In such an embodiment, the rear wall portion is freely suspended between the side walls with its guide members, as it were. When the position and the movement of the rear wall portion are to be completely fixated, the guideways may furthermore comprise lower guides present at the bottom side of the side walls, which extend at varying distances from the upper guides, in which case the rear wall portion will be provided with corresponding cooperating guide members at its bottom side as well.

In this embodiment, the aforesaid varying distance between the upper guides and the lower guides functions to impart such a forced movement to the rear wall portion during its forward movement, that the lower side of the rear wall portion can pass obstacles, such as the wheel housings of the vehicle. Also other geometric conditions within the vehicle can necessitate such a forced movement of the rear wall portion. If free forward movement of the rear wall portion is possible, on the other hand, it will also be possible to maintain a constant spacing between the lower guides and the upper guides.

It is further possible for the rear wall portion and the rear roof portion to have common guideways. If the rear wall portion and the rear roof portion are not interconnected or are movably interconnected, however, the rear wall portion is preferably movable in guides which are connected to a stationary portion of the vehicle body.

It is noted, perhaps unnecessarily, that the rear wall portion may co-act with guides, and that the rear wall portion may be connected to the rear roof portion in such a manner that it does not have any guideways of its own.

The stationary portion to which guides for the rear wall portion, if present, are connected, can be made up of the side walls and/or the front roof portion.

The rear wall portion may be a hatchback of the vehicle, which may or may not be provided with a rear window. Generally, such a hatchback is pivotally connected to the roof portion that is disposed thereabove, in this case the aforesaid rear wall portion.

The rear roof portion can form a closure element of an open roof construction. In such a case the closure element has a dual function: when said closure element is moved, a roof opening is formed in the manner of a sun roof, as is usual with an open roof construction. When the closure element is moved along with the rear wall portion, a freely accessible loading space is obtained in the above-described manner.

According to a final possibility, the side walls of the vehicle body are at least partially removable in the forward position of the rear wall portion and the rear roof portion. In that case the loading space that is created is adapted for accommodating even larger objects, which may also extend beyond the lateral boundaries of the vehicle.

BRIEF DESCRIPTION OF THE DRAWINGS

The invention will now be explained in more detail with reference to the drawing, in which.

DETAILED DESCRIPTION OF THE PREFERRED EMBODIMENTS

Figure 1:
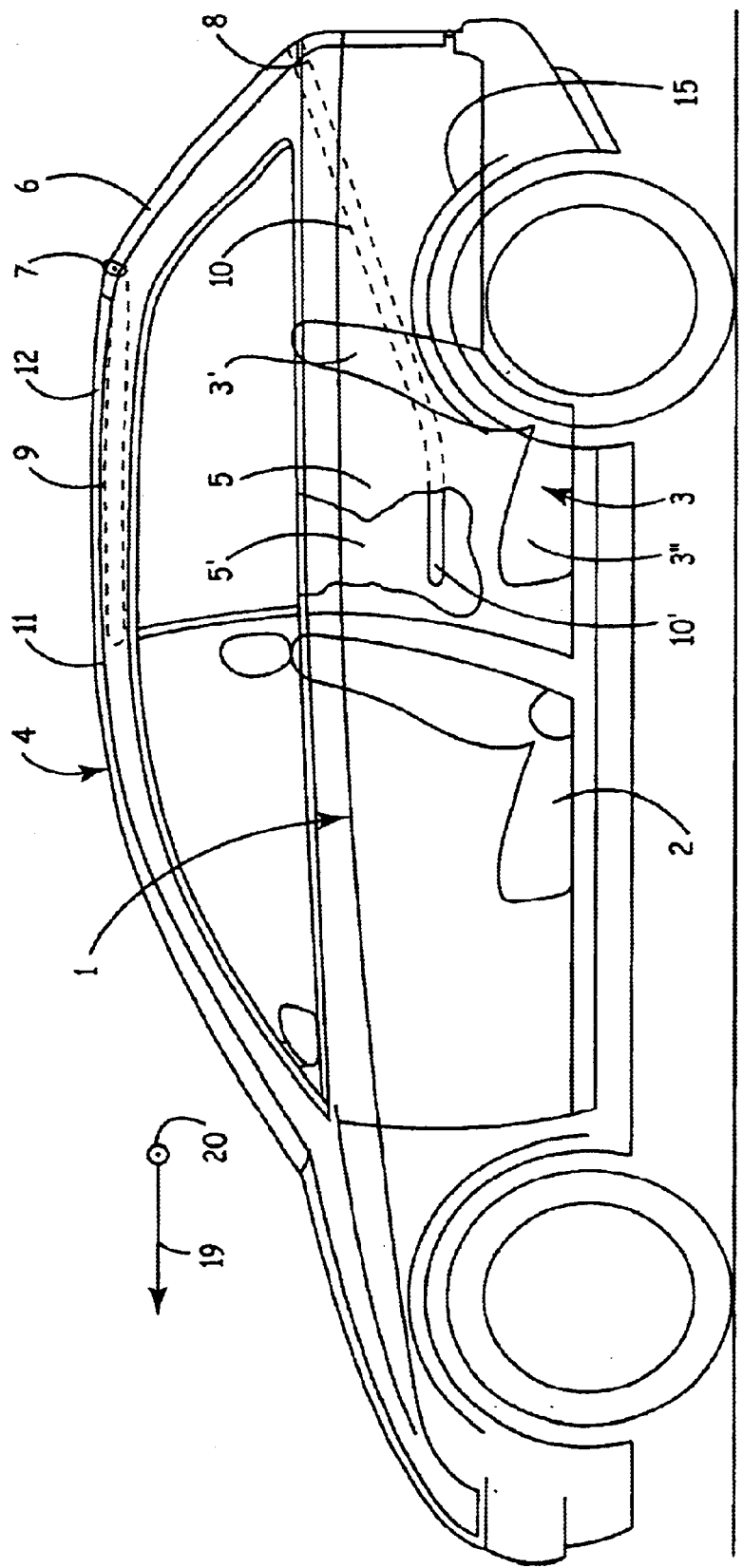
FIG. 1 is a schematic side elevation of a vehicle according to the invention, in a first position thereof.

In FIG. 1, a vehicle comprising a body 1 is shown in schematic side elevation. Said body 1 encloses a passenger compartment, wherein front seats 2 and rear seats 3 of are shown. The body 1 comprises at least the following vehicle parts: a roof 4, which is present at the upper side of the vehicle, two side walls 5, 5' which are positioned on either side of a longitudinal axis 19 (front to back) of the vehicle (the left side wall is visible, the other side wall 5' being substantially a mirror image of the left side wall), and a rear wall 6 in the form of a hatchback.

The hatchback 6 includes guide members 7, 8, for example in the form of guide rollers or the like, both at its upper end and at its lower end. The upper guide members cooperate with upper guides 9 (illustrated in dotted lines), while the lower guide members 8 cooperate with lower guides 10, 10'. In this exemplary embodiment, the lower guides 10, 10' are formed in the side walls 5 and the upper guides 9 may be formed in the side walls 5, the roof 4 or the transition areas between the side walls 5 and the roof 4. The exact location of the guides depends on the geometry of the vehicle.

In the illustrated embodiment, the upper guide members 7 also define a hinge, on which the hatchback 6 can pivot about a transverse axis 20 of the vehicle. In the starting position as shown in FIG. 1, such a pivoting movement takes place in order to open and close the hatchback 6, in order to gain access to the interior of the vehicle from the rear side in a conventional manner.

The roof 4 includes a fixed front roof portion 11 and a movable rear roof portion 12. The rear wall portion 12 may form the movable closure element of an open roof construction, which is known per se.

Figure 2:
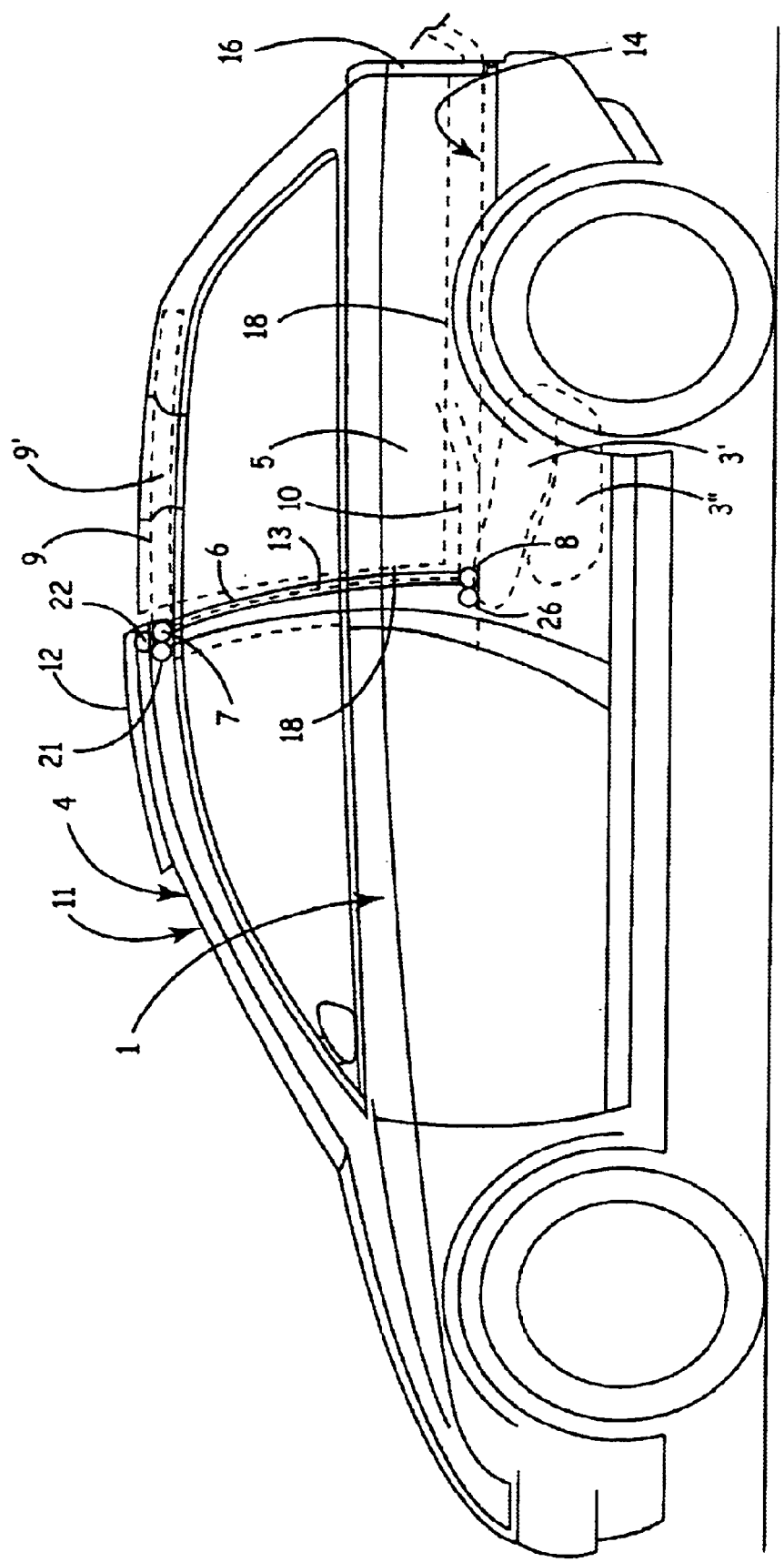
FIG. 2 is a corresponding side view of the vehicle in a second position thereof.

The hatchback 6 is movable in a forward direction between the spaced-apart side walls 5, 5' with respect to the vehicle, as a result of the cooperation between the guide members 7 and 8 and the guides 9, 9' and 10. A possible rear position of the hatchback 6 is shown in FIG. 1. Furthermore, the rear roof portion 12 is movable in the forward direction of the vehicle; to this end, as illustrated in FIG. 2, said roof portion 12 can co-act, via guide members 7(schematically shown), with guides (for example the upper guides 9, 9'), but also any other operating mechanism that is known from the field of open roof constructions can be used for this purpose. In this embodiment, the rear movable roof portion 12 is stacked with, for example or positioned above, the fixed roof portion 11 in its forward position, as appears from FIG. 2, but could also be positioned below, if desired. In the forward position of the rear wall portion or hatchback 6 and the movable rear roof portion 12 that is shown in FIG. 2, a loading space being readily accessible from above and from the rear is obtained on the rear side of the vehicle, between the side walls 5, 5'. The passenger compartment, which initially extended over a large part of the length of the vehicle, is now reduced, its rear side ending at the location of the new position of the hatchback as shown in FIG. 2.

Figure 3:
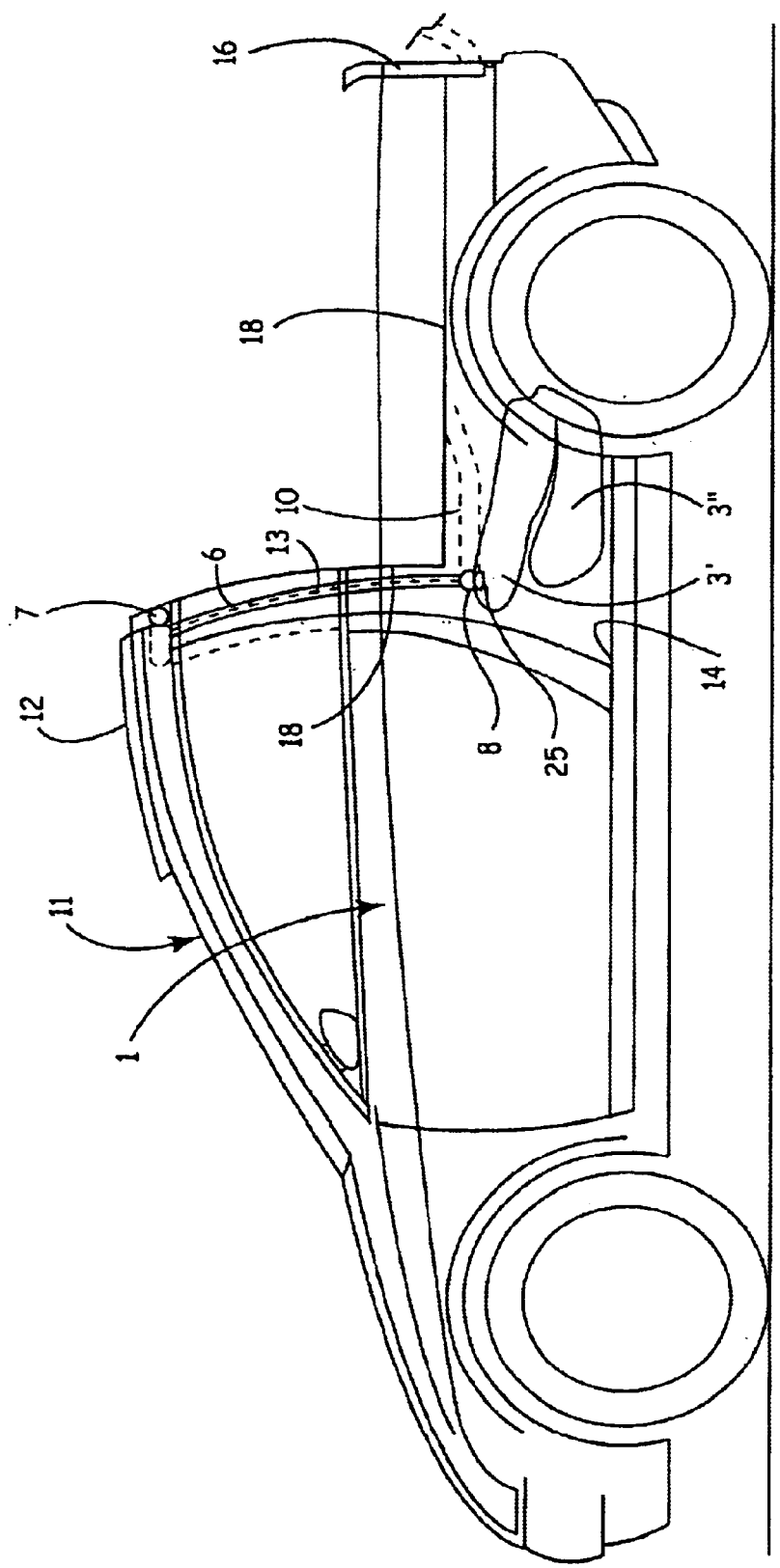
FIG. 3 is the side view of FIG. 2 with vehicle side panel removed.
Figure 4:
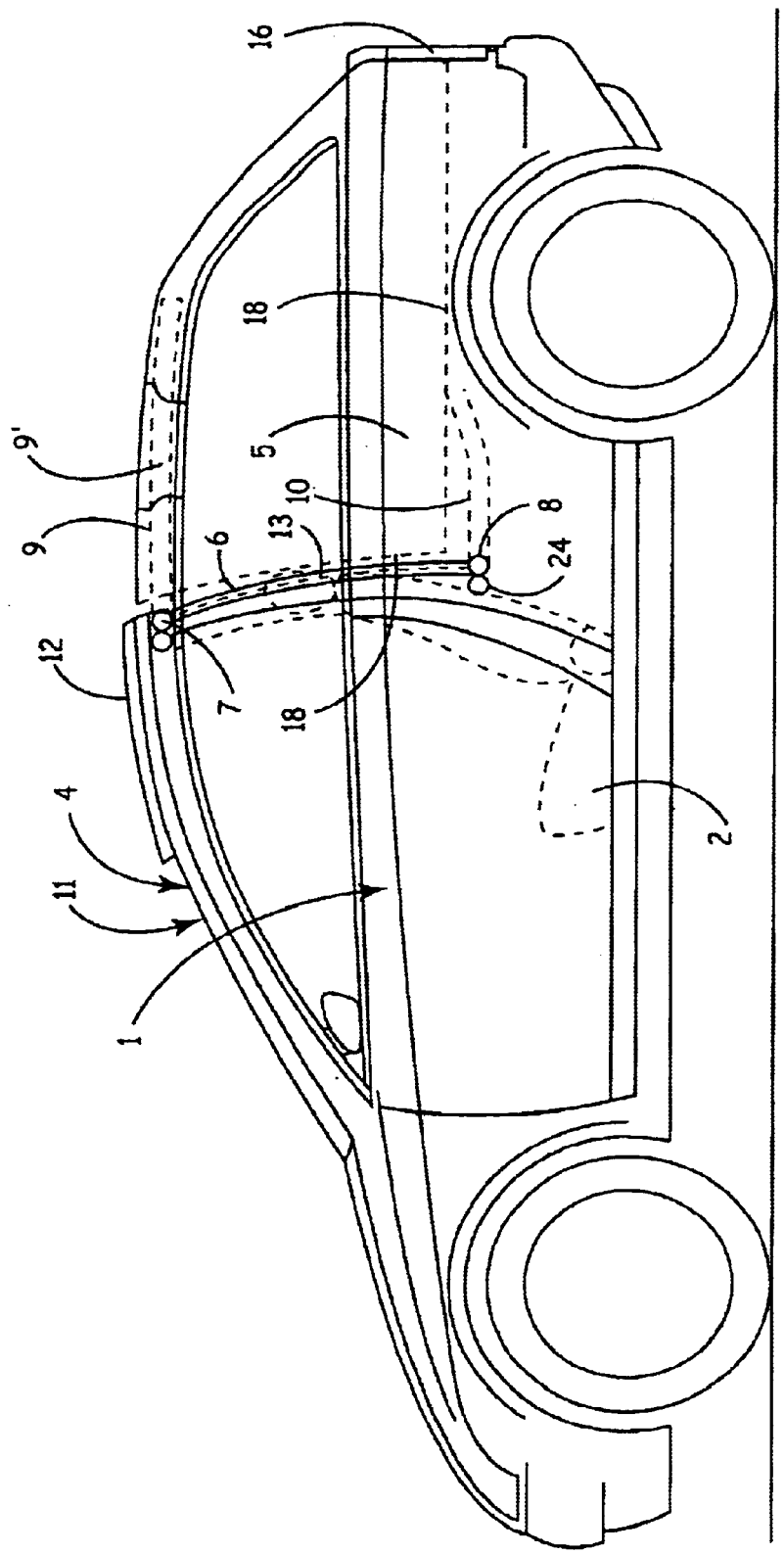
FIG. 4 is a side view with front seat sealingly engaging hatchback.

In its forward position, as shown in FIG. 2, the hatchback sealingly engages a number of vehicle parts so as to ensure that the reduced passenger compartment is adequately sealed. Thus, FIGS. 2 and 3 shows clearly that the bottom edge of the hatchback 6 abuts or seals (as indicated schematically by seal 25) against a backrest 3' of the rear seats 3 which has been swung down onto the bottom seat portion 3" of said seats. Dotted line 13 schematically indicates sealing elements, such as a rubber sealing section, which effect a seal between the hatchback 6 and the side walls 5. Such sealing elements 13 can be arranged on the hatchback 6, on the side walls 5, or on both. Similarly, sealing elements 13 can effect a seal between the upper side of the hatchback 6 and the roof 4 of the vehicle, for example the fixed roof portion 11 (as indicated schematically by seal 21) and/or the movable rear roof portion 12 (as indicated schematically by seal 22). According to another embodiment, the hatchback 6 sealingly engages other vehicle parts, for example, a vehicle floor 14 (as indicated schematically by seal 26) or the front seats 2 can be directly engaged as indicated schematically by seal 24 in FIG. 4). In contrast to the situation as shown in the drawing, the hatchback 6 may be movable in a forward direction in combination with the rear roof portion 12, and a hinge may be present between the two vehicle parts, which also forms a sealing connection between the two parts in all its positions. This hinge also functions as the aforesaid hinge 7 in that case.

From a comparison between FIGS. 1 and 2 it clearly appears that the hatchback 6 is not only moved in a forward direction, but can also assume a different angle of inclination. This specific movement is effected by the relative positions between the upper guide 9 and the lower guide 10. In particular, it appears that the spacing between said guides varies. In this way it can be ensured, for example, that the lower edge of the hatchback 6 remains clear of internal wheel housings 15 during the forward movement thereof. Depending on the type of vehicle, it is conceivable, however, for the upper guides and lower guides to extend parallel to each other. It is even possible to use only upper guides 9.

The figures furthermore show that the rear wall of the vehicle is partially made up of a lower, tailgate-like portion 16. Said tailgate-like portion 16 is pivotable about a hinge 17 (as is schematically indicated by the dotted position in FIG. 2). In this manner, additional access to the loading space can be provided.

Finally, in FIGS. 2 and 3, dotted lines 18 schematically indicate the presence of divisions in the side walls; the side wall portions of the vehicle that are present above and to the right of said divisions can be removed at the location of said divisions, as a result of which the loading space being formed will be even more readily accessible.

The movement of the hatchback 6 and the rear roof portion 12 can take place manually; it is also possible, however, to provide a driving unit (not shown) for this purpose, for example an electric motor. Such driving units are known, inter alia from the field of open roof constructions.

Although the present invention has been described with reference to preferred embodiments, workers skilled in the art will recognize that changes may be made in form and detail without departing from the spirit and scope of the invention.

What is claimed is:

1. A vehicle comprising: a passenger compartment enclosed by a body, wherein the body includes at least a roof, two side walls positioned opposite each other on either side of a longitudinal axis of the vehicle, which join the roof, and a rear wall, which joins both the roof and the side walls, wherein at least a portion of the rear wall and a rear portion of the roof can be moved in a forward direction to a forward position so as to reduce the passenger compartment and form a freely accessible loading space located therebehind, wherein the rear wall portion is provided with upper and lower guide members which co-act with stationary guideways, wherein the guideways comprise upper guides present at an upper side of the side walls, which extend substantially parallel to the roof, wherein the upper guide members of the rear wall portion are disposed on an end of the rear wall portion proximate the roof, wherein the guideways further comprise lower guides disposed on the side walls, which extend at varying distances from the upper guides, wherein the lower guide members of the rear wall portion are provided on an end of the rear wall portion remote from the roof.

2. The vehicle according to claim 1, wherein in the forward position of said rear wall portion and said rear portion of the roof, the reduced passenger compartment is sealed.

3. The vehicle according to claim 2, wherein the rear wall portion sealingly engages at least one of the following vehicle parts in the forward position: the side walls, the fixed front roof portion, said rear portion of the roof, a vehicle floor, front seats and rear seats present in the passenger compartment.

4. The vehicle according to claim 1, wherein said rear wall portion is furthermore pivotable about an axis transverse to the longitudinal axis of the vehicle.

5. The vehicle according to claim 1, wherein said rear wall portion can be jointly moved with the rear roof portion.

6. The vehicle according to claim 5, wherein said rear wall portion and said rear roof portion are interconnected by a hinge.

7. The vehicle according to claim 6, wherein the hinge forms a sealing joint between the rear wall portion and the rear roof portion in all its positions.

8. The vehicle according to claim 1, wherein the rear roof portion is movable in guides which are connected to a stationary portion of the vehicle body.

9. The vehicle according to claim 8, wherein said stationary portion of the vehicle body is made up of at least one of the side walls and the front roof portion.

10. The vehicle according to claim 1, wherein the rear wall portion of the vehicle is a hatchback of the vehicle.

11. The vehicle according to claim 1, wherein the rear roof portion forms a closure element of an open roof construction.

12. The vehicle according to claim 1, wherein the side walls of the vehicle body are at least partially removable in the forward position of the rear wall portion and the rear roof portion.

13. The vehicle according to claim 1, wherein the rear portion of the roof comprises a rigid panel that moves relative to a fixed front roof portion of the roof and is stacked with the fixed front roof portion in the forward position.

14. A vehicle comprising: a passenger compartment enclosed by a body, wherein the body includes at least a roof, two side walls positioned opposite each other on either side of a longitudinal axis of the vehicle, which join the roof, and a rear wall, which joins both the roof and the side walls, wherein at least a portion of the rear wall and a rear portion of the roof can be moved in a forward direction to a forward position while the side walls remain stationary, so as to reduce the passenger compartment and form a freely accessible loading space located therebehind, wherein the rear wall portion comprises upper and lower guide members which co-act with stationary guideways, the stationary guideways comprising upper guides present at an upper side of the side walls and extending substantially parallel to the roof and lower guides disposed on the side walls and extending at varying distances from the upper guides, wherein the upper guide members are disposed on an end of the rear wall portion proximate the roof, and wherein the lower guide members are provided on an end of the rear wall portion remote from the roof.

15. The vehicle according to claim 14, wherein the portion of the rear wall remains substantially vertical while moving to and from the forward position.

* * * * *